(12) United States Patent
Park et al.

(10) Patent No.: US 10,575,314 B2
(45) Date of Patent: Feb. 25, 2020

(54) METHOD FOR TRANSMITTING TRIGGER FRAME IN WIRELESS LAN SYSTEM AND TERMINAL USING SAME

(71) Applicant: LG ELECTRONICS INC., Seoul (KR)

(72) Inventors: Hyunhee Park, Seoul (KR); Kiseon Ryu, Seoul (KR); Jinyoung Chun, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 15/769,323

(22) PCT Filed: Oct. 20, 2016

(86) PCT No.: PCT/KR2016/011833
§ 371 (c)(1),
(2) Date: Apr. 18, 2018

(87) PCT Pub. No.: WO2017/069534
PCT Pub. Date: Apr. 27, 2017

(65) Prior Publication Data
US 2018/0317235 A1 Nov. 1, 2018

Related U.S. Application Data

(60) Provisional application No. 62/244,139, filed on Oct. 20, 2015, provisional application No. 62/244,151, filed on Oct. 20, 2015.

(51) Int. Cl.
*H04W 72/08* (2009.01)
*H04W 74/08* (2009.01)
*H04W 84/12* (2009.01)

(52) U.S. Cl.
CPC ......... *H04W 72/087* (2013.01); *H04W 74/08* (2013.01); *H04W 84/12* (2013.01)

(58) Field of Classification Search
CPC ............... H04W 84/12; H04W 72/121; H04W 74/0816; H04W 74/08; H04W 74/002;
(Continued)

(56) References Cited

U.S. PATENT DOCUMENTS

| 2007/0121542 | A1 | 5/2007 | Lohr et al. |
| 2012/0051342 | A1* | 3/2012 | Liu ...................... H04W 72/10 370/338 |

(Continued)

FOREIGN PATENT DOCUMENTS

| JP | 2015100100 | 5/2015 |
| KR | 1020110116978 | 10/2011 |
| WO | 2013191448 | 12/2013 |

OTHER PUBLICATIONS

PCT International Application No. PCT/KR2016/011833, International Search Report dated Jan. 23, 2017, 6 pages.

*Primary Examiner* — Natasha W Cosme
(74) *Attorney, Agent, or Firm* — Lee Hong Degerman Kang & Waimey

(57) ABSTRACT

According to one embodiment of the present specification, a method for transmitting a trigger frame for requesting uplink data to be received through an wireless resource individually configured in an overlapped time duration from a plurality of terminals in a wireless LAN system, comprises: a step for receiving, by an access point, a first buffer state frame from a first terminal, wherein the first buffer state frame includes first QoS information of first uplink data; a step for receiving, by the access point, a second buffer state frame from a second terminal, wherein the second buffer state frame includes second QoS information of second uplink data; a step for determining, by the access point, a
(Continued)

first primary AC for a trigger frame on the basis of the first QoS information and the second QoS information, wherein the access point includes a plurality of AP buffers for downlink data to be transmitted to a plurality of terminals; and a step for transmitting, by the access point, the trigger frame through the downlink buffer corresponding to the determined first primary AC among the plurality of AP buffers.

4 Claims, 20 Drawing Sheets

(58) Field of Classification Search
CPC ......... H04W 74/0808; H04W 74/0833; H04W 74/02; H04W 72/02; H04W 72/10; H04W 72/1284; H04W 72/1289; H04W 84/02; H04W 28/06; H04W 48/10; H04W 74/00; H04W 74/06; H04W 80/02; H04W 88/08; H04W 28/0278; H04L 5/0044; H04L 5/0023; H04L 5/0007; H04L 27/2601; H04L 5/0053; H04L 27/2602; H04L 5/0037; H04L 5/0064; H04L 27/0006; H04L 27/2035; H04L 27/2613; H04L 27/2614; H04L 27/2628; H04L 5/0028; H04L 5/0091; H04L 65/4076; H04L 65/80; H04L 69/324; H04L 1/00; H04L 1/0001
USPC ....................................................... 370/329
See application file for complete search history.

(56) References Cited

U.S. PATENT DOCUMENTS

2012/0314694 A1\* 12/2012 Hsieh ................... H04W 74/085
                                                                370/338
2013/0229995 A1      9/2013 Cai et al.
2016/0316458 A1\* 10/2016 Kwon ................. H04L 27/2601

\* cited by examiner

METHOD FOR TRANSMITTING TRIGGER FRAME IN WIRELESS LAN SYSTEM AND TERMINAL USING SAME

CROSS-REFERENCE TO RELATED APPLICATIONS

This application is the National Stage filing under 35 U.S.C. 371 of International Application No. PCT/KR2016/011833, filed on Oct. 20, 2016, which claims the benefit of U.S. Provisional Application Nos. 62/244,139, filed on Oct. 20, 2015, and 62/244,151, filed on Oct. 20, 2015, the contents of which are all hereby incorporated by reference herein in their entirety.

BACKGROUND OF THE INVENTION

Field of the Invention

The present specification relates to a scheme of transmission/receiving data in wireless communication, and more particularly, to a method of transmitting a trigger frame for requesting uplink data to be received through a radio resource individually configured in an overlapping time interval from a plurality of terminals in a wireless local area network (LAN) system, and the terminal using the method.

Related Art

A next-generation WLAN is aimed at 1) improving Institute of Electrical and Electronics Engineers (IEEE) 802.11 physical (PHY) and medium access control (MAC) layers in bands of 2.4 GHz and 5 GHz, 2) increasing spectrum efficiency and area throughput, and 3) improving performance in actual indoor and outdoor environments, such as an environment in which an interference source exists, a dense heterogeneous network environment, and an environment in which a high user load exists.

In the next-generation WLAN, a dense environment having a great number of access points (APs) and stations (STAs) is primarily considered. Discussions have been conducted on improvement in spectrum efficiency and area throughput in this dense environment. The next-generation WLAN pays attention to actual performance improvement not only in an indoor environment but also in an outdoor environment, which is not significantly considered in the existing WLAN.

Specifically, scenarios for a wireless office, a smart home, a stadium, a hotspot, and the like receive attention in the next-generation WLAN. Discussions are ongoing on improvement in the performance of a WLAN system in the dense environment including a large number of APs and STAs based on relevant scenarios.

Further, in the next generation WLAN, active discussion is expected on system performance improvement in an overlapping basic service set (OBSS) environment, outdoor environmental performance improvement, cellular offloading, or the like, rather than single link performance improvement in one basic service set (BSS). Directionality of the next generation WLAN implies that the next generation WLAN gradually has a technical range similar to mobile communication. Recently, considering that mobile communication and WLAN technologies are discussed together in a small cell and a direct-to-direct (D2D) communication region, technology and business convergence of the next generation WLAN and the mobile communication is expected to be more active.

SUMMARY OF THE INVENTION

The present specification provides a method of transmitting a trigger frame for requesting uplink data with improved performance in a wireless local area network (LAN) system, and a terminal using the method.

The present specification relates to a method of transmitting a trigger frame for requesting uplink data in a wireless LAN system, and a terminal using the method.

According to an embodiment of the present invention, there is provided a method of transmitting a trigger frame which requests uplink data to be received through a radio resource individually configured in an overlapping time interval from a plurality of terminals in a wireless LAN system. The method may include: receiving, by an access point (AP), a first buffer status frame from a first terminal, wherein the first buffer status frame includes first quality of service (QoS) information of first uplink data; receiving, by the AP, a second buffer status frame from a second terminal, wherein the second buffer status frame includes second QoS information of second uplink data; determining, by the AP, a first primary access category (AC) for the trigger frame on the basis of the first QoS information and the second QoS information, wherein the AP includes a plurality of AP buffers for downlink data to be transmitted to the plurality of terminals; and transmitting, by the AP, the trigger frame through a downlink buffer corresponding to the determined first primary AC among the plurality of AP buffers.

According to an embodiment of the present specification, there is provided a method of requesting uplink data with improved performance in a wireless local area network (LAN) system, and a terminal using the method.

DESCRIPTION OF EXEMPLARY EMBODIMENTS

The aforementioned features and following detailed descriptions are provided for exemplary purposes to facilitate explanation and understanding of the present specification. That is, the present specification are not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also includes complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

Figure 1:
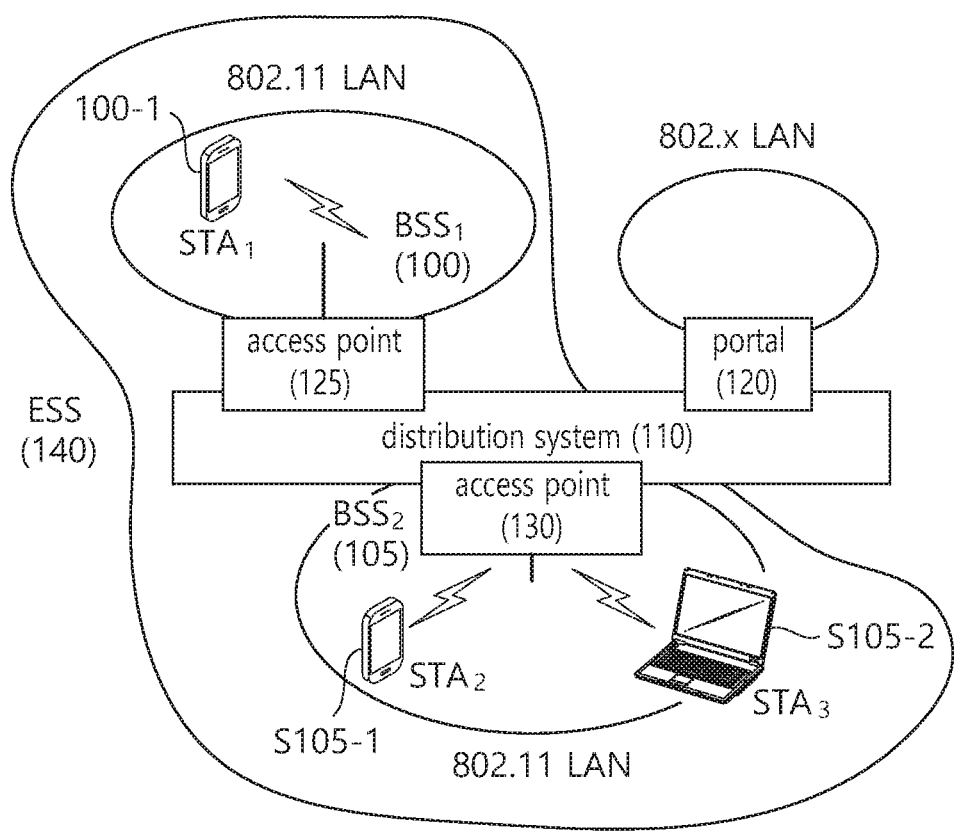
FIG. 1 is a conceptual view illustrating the structure of a wireless local area network.
Figure 1:
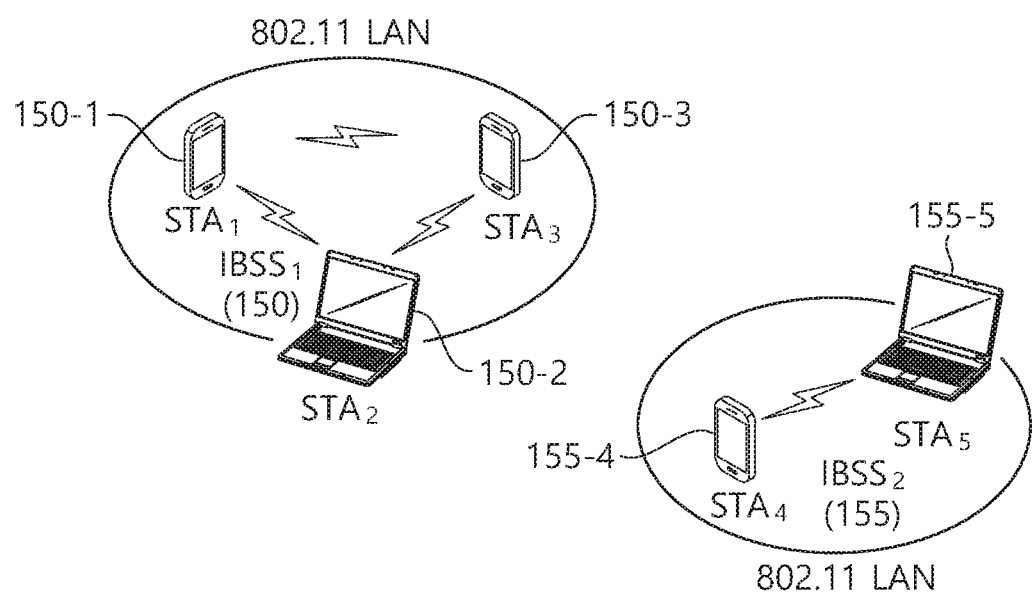

FIG. 1 is a conceptual view illustrating the structure of a wireless local area network (WLAN). FIG. 1 (A) illustrates the structure of an infrastructure basic service set (BSS) of institute of electrical and electronic engineers (IEEE) 802.11.

Referring the FIG. 1 (A), the wireless LAN system (10) of the FIG. 1 (A) may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region.

For example, The BSS 100 may include one AP 110 and one or more STAs 100-1 which may be associated with one AP 110. The BSS 105 may include one or more STAs 105-1 and 105-2 which may be associated with one AP 130.

The infrastructure BSS 100, 105 may include at least one STA, APs 125, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the wireless LAN network (IEEE 802.11) and another network (e.g., 802.X).

In the BSS illustrated in the FIG. 1 (A), a network between the APs 110 and 130 and a network between the APs 110 and 130 and the STAs 100-1, 105-1, and 105-2 may be implemented.

FIG. 1 (B) illustrates a conceptual view illustrating the IBSS.

Referring to FIG. 1(B), a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1 (B), the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner. In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
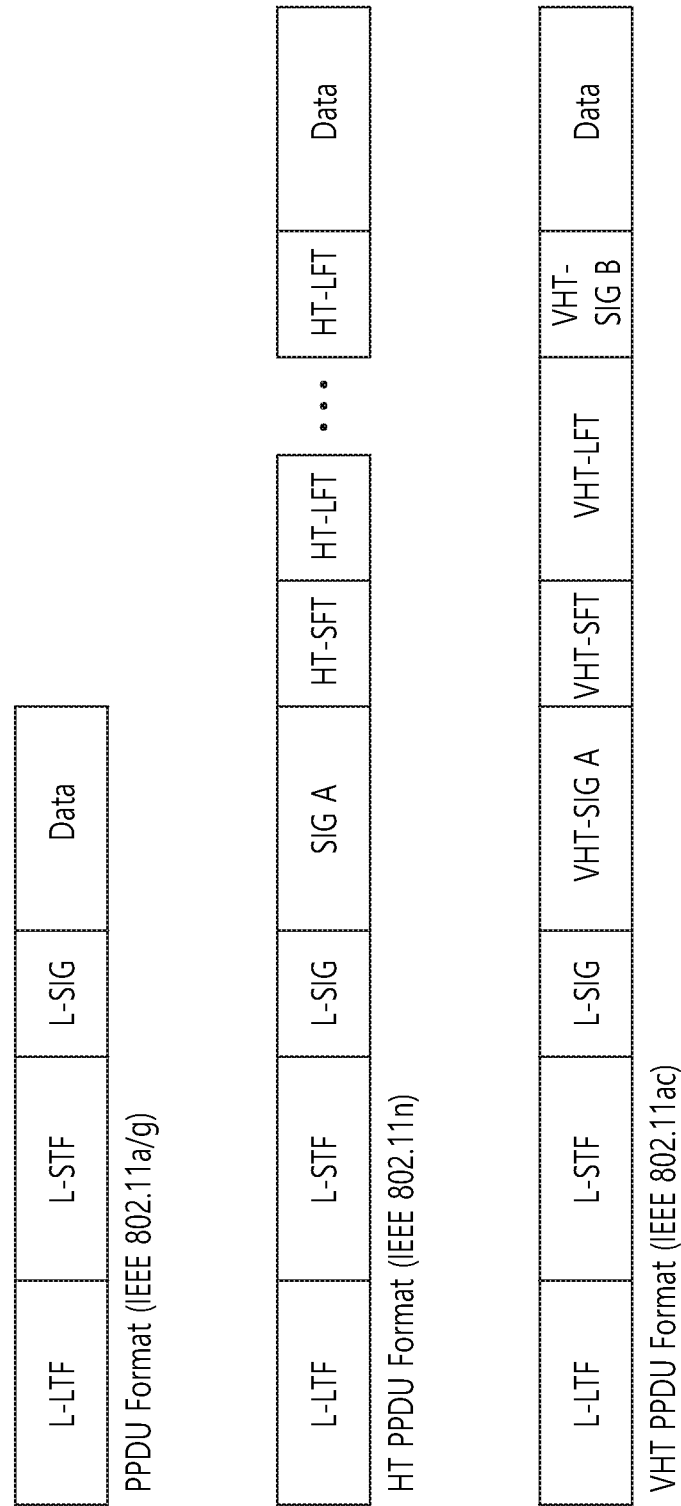
FIG. 2 is a conceptual view illustrating a layered architecture of a WLAN system supported by IEEE 802.11.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
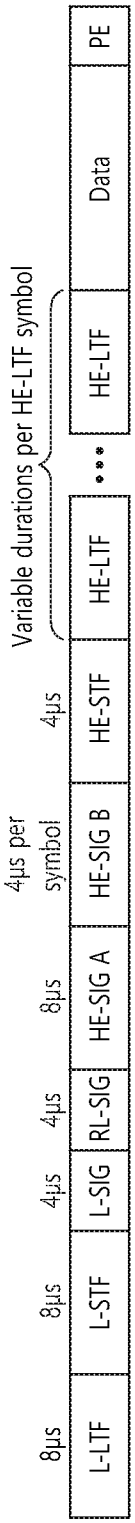
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
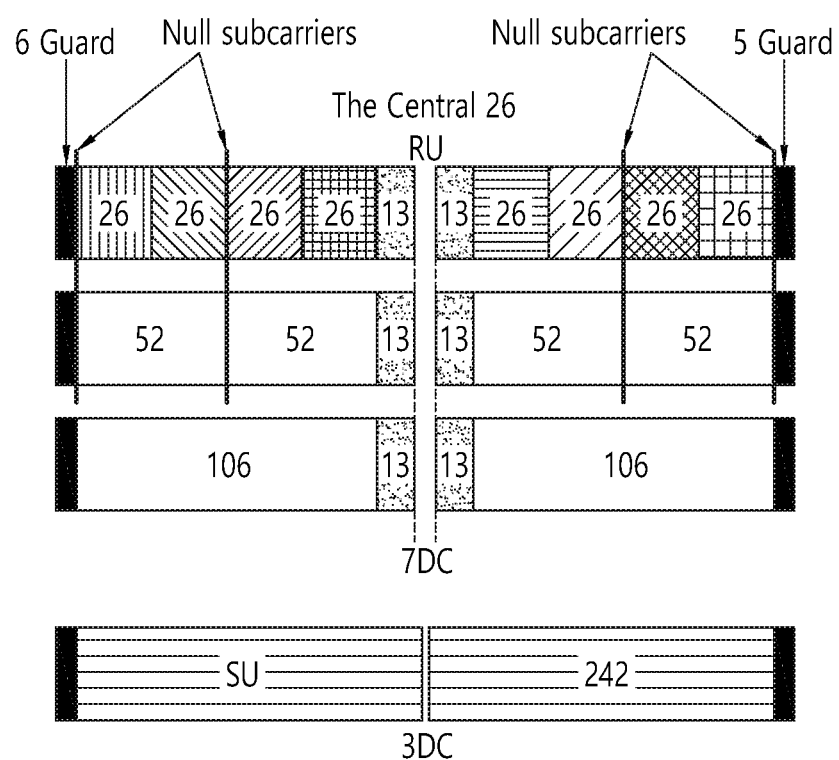
FIG. 4 is a diagram illustrating a layout of resource units used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
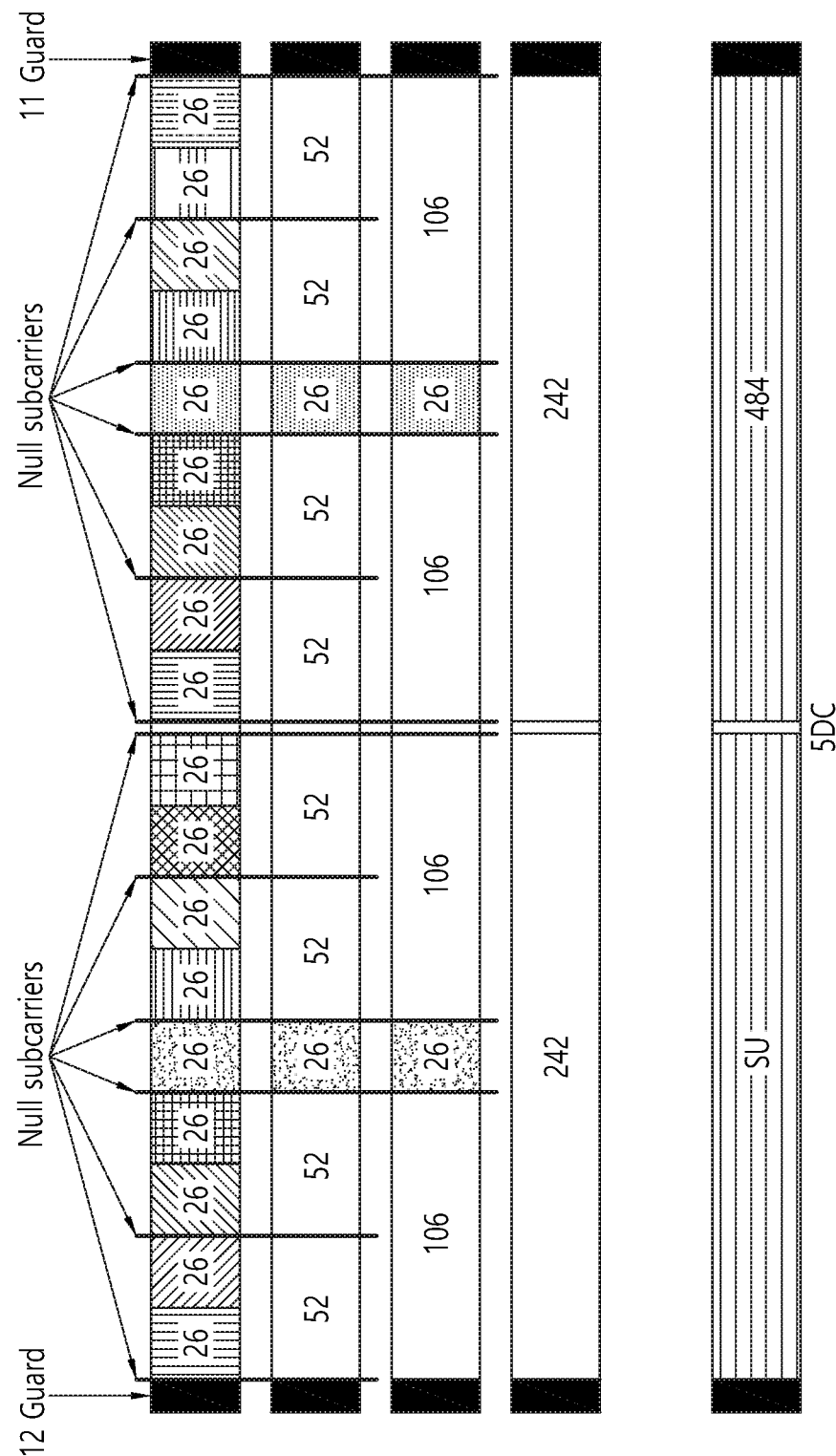
FIG. 5 is a diagram illustrating a layout of resource units used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
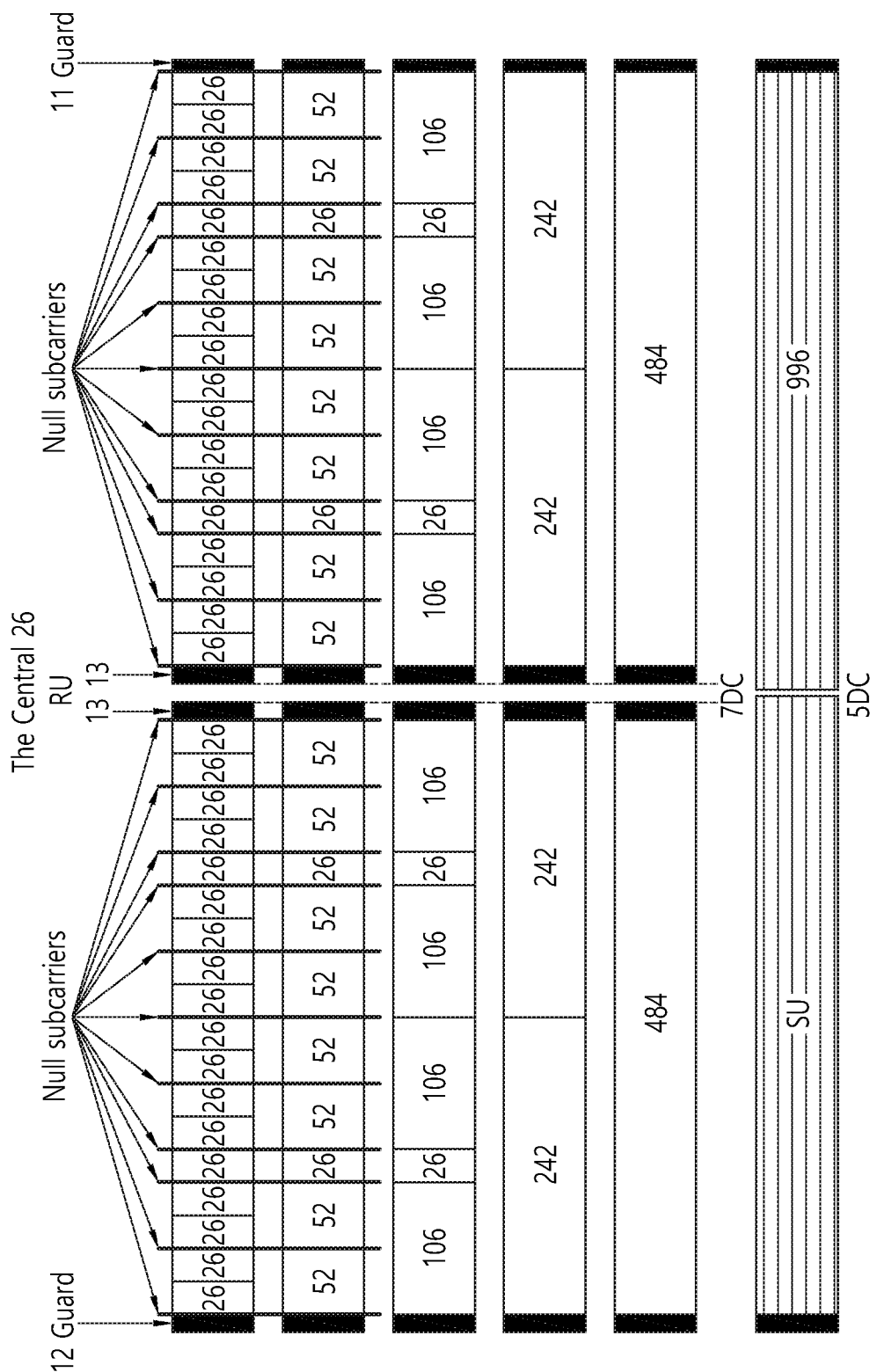
FIG. 6 is a diagram illustrating a layout of resource units used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
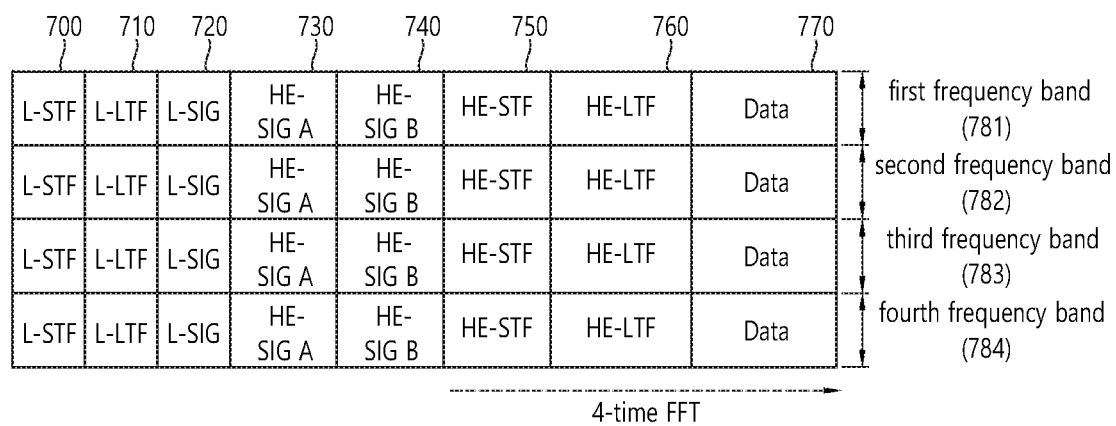
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Principally, an HE-SIG-A 730 or an HE-SIG-B 740 may include resource allocation information (alternatively, virtual resource allocation information) for at least one receiving STA.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 8:
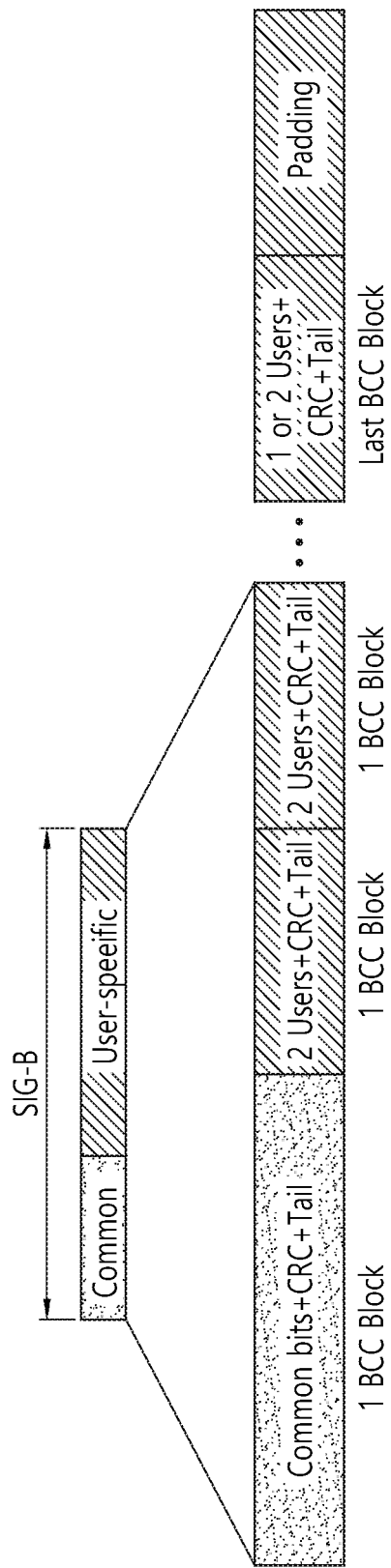
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

Figure 9:
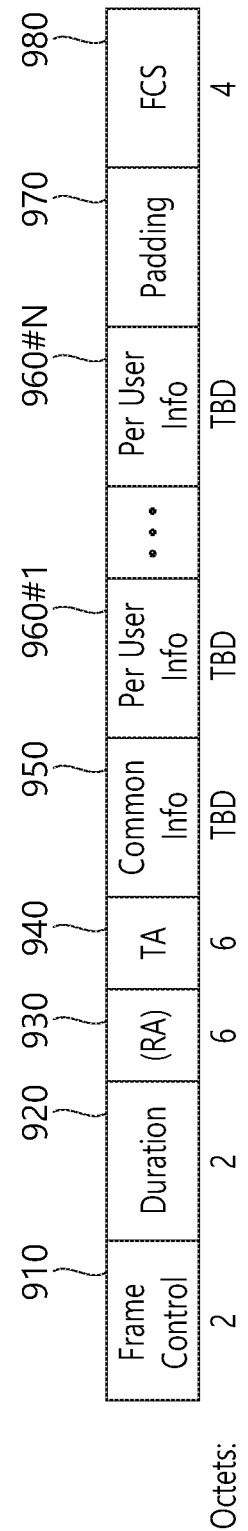
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame.

It is preferable that the trigger frame of FIG. 9 includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 10:
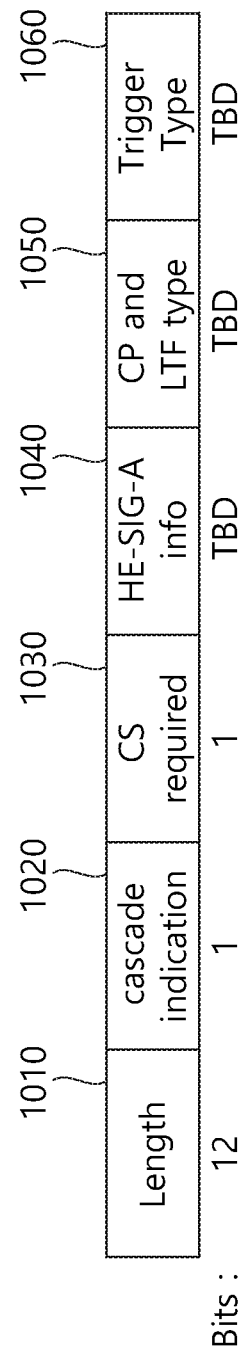
FIG. 10 illustrates an example of a sub-field included in a per user information field.

FIG. 10 illustrates an example of a sub-field included in a per user information field. Some parts of the sub-field of FIG. 10 may be omitted, and extra sub-fields may be added. Further, a length of each of the sub-fields shown herein may change.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Figure 11:
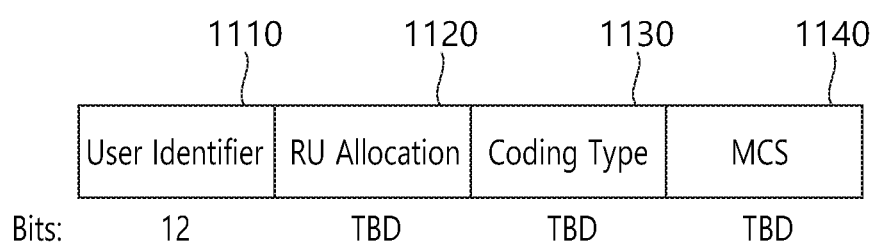
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information corresponds, and an example of the identifier may correspond to all or part of an association identifier AID.

Additionally, a RU Allocation field 1120 may be included in the sub-field of the per user information field. More specifically, in case a receiving STA, which is identified by the User Identifier field 1110, transmits an uplink PPDU in response to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted in response to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted in response to the trigger frame of FIG. 9.

For example, when BCC coding may is applied to the uplink PPDU, the coding type field 1130 may be set to '1', and when the LDPC coding is applied, the coding type field 1130 may be set to '0'.

Figure 12:
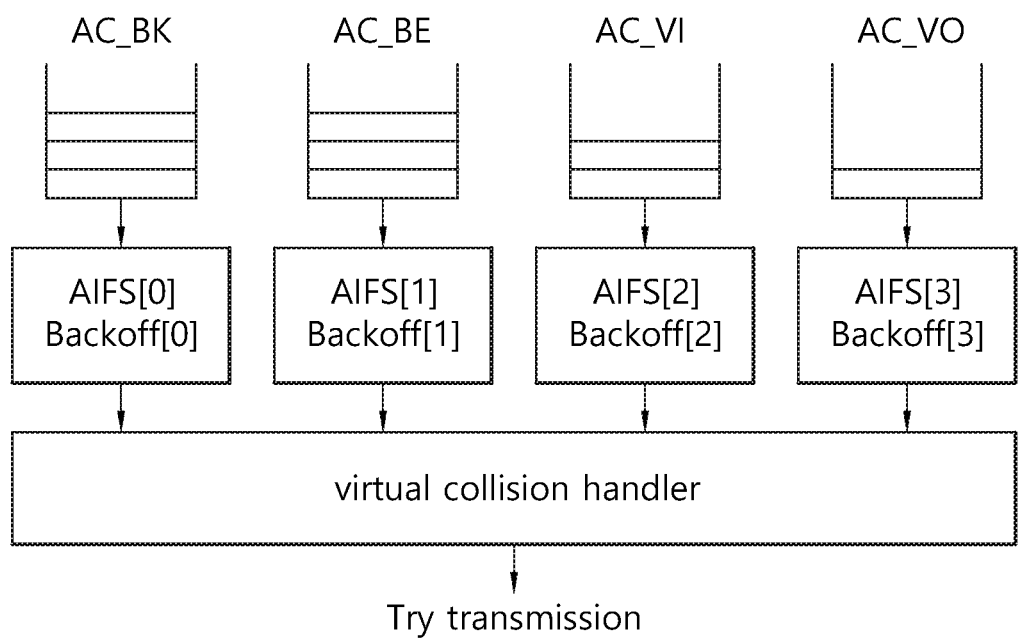
FIG. 12 illustrates an EDCA-based channel access method in a WLAN system.

FIG. 12 is a concept view showing a channel access method based on enhanced distributed channel access (EDCA) in a WLAN.

In the WLAN, an STA performing channel access based on EDCA may perform channel access by defining a plurality of user priorities for traffic data. In order to transmit a quality of service (QoS) data frame based on the priority, four access categories (ACs) are defined for the EDCA, that is, AC_BK(background), AC_BE(best effort), AC_VI(video), AC_VO(voice). In the EDCA, traffic data which has a different user priority and arrives at a medium access control (MAC) layer may be mapped based on the AC as shown in Table 1 below.

Table 1 is an exemplary table showing mapping between the user priority and the AC.

TABLE 1

| priority | user priority | AC (access category) |
|---|---|---|
| low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| high | 7 | AC_VO |

A transmission queue and an AC parameter may be defined for each AC. A transmission priority difference may be implemented between ACs on the basis of AC parameter values which are set to be different from each other. In a backoff procedure for transmitting a frame belonging to the AC, the EDCA may use arbitration interframe space (AIFS) [AC], CWmin[AC], and CWmax[AC] respectively instead of DCF interframe space (DIFS), CWmin, and CWmax which are parameters for the backoff procedure based on a distributed coordination function (DCF).

An EDCA parameter used in the backoff procedure for each AC may be delivered to each STA from an AP by being carried on a beacon frame. When the values AIFS [AC] and CWmin[AC] are small, a priority is high, and thus a channel access delay is short, which leads to the use of more bands in a given traffic environment.

Specifically, the AP may transmit to the STA an EDCA parameter set element including information regarding a parameter for the EDCA-based channel access. The EDCA parameter set element may include information regarding a channel access parameter (e.g., AIFS [AC], CWmin [AC], CWmax [AC]) for each AC.

If a collision occurs between STAs while the STAs are transmitting frames, an EDCA backoff procedure for generating a new backoff count is similar to the existing DCF backoff procedure. However, a backoff procedure differentiated for each AC of the EDCA may be performed based on an EDCA parameter individually configured for each AC. The EDCA parameter is an important means used to differentiate channel access of a variety of user priority traffic.

By properly setting an EDCA parameter value which defines a channel access parameter different for each AC, transmission effectiveness may be increased by a traffic priority while optimizing network performance. Therefore, the AP must perform overall management and coordination functions for the EDCA parameter in order to ensure fair access to all STAs participating in a network.

Referring to FIG. 12, transmission queues for respective 4 ACs defined in 802.11e MAC may serve as individual EDCA contention entities for wireless media access in one STA. One AC may have its own AIFS value and maintain a backoff count.

If there is at least one AC for which backoff is simultaneously finished, a collision between ACs may be coordinated by a virtual collision handler. A frame existing in an AC having a highest priority is first transmitted, and the other ACs update the backoff count again by increasing a contention window value.

A start of transmission opportunity (TXOP) occurs when a channel is accessed according to an EDCA rule. When at least two frames are stacked in one AC, an EDCA MAC may attempt transmission of several frames if EDCA TXOP is obtained. If an STA has already transmitted one frame and can transmit a next frame existing in the same AC within the remaining TXOP time and can receive up to ACK for this, the STA attempts transmission of the frame after an SIFS time interval. A TXOP limit value may be delivered from an AP to the STA.

If a size of a data frame to be transmitted exceeds the TXOP limit value, the AP fragments the frame into several small frames and transmits the frames within a range not exceeding the TXOP limit value.

Figure 13:
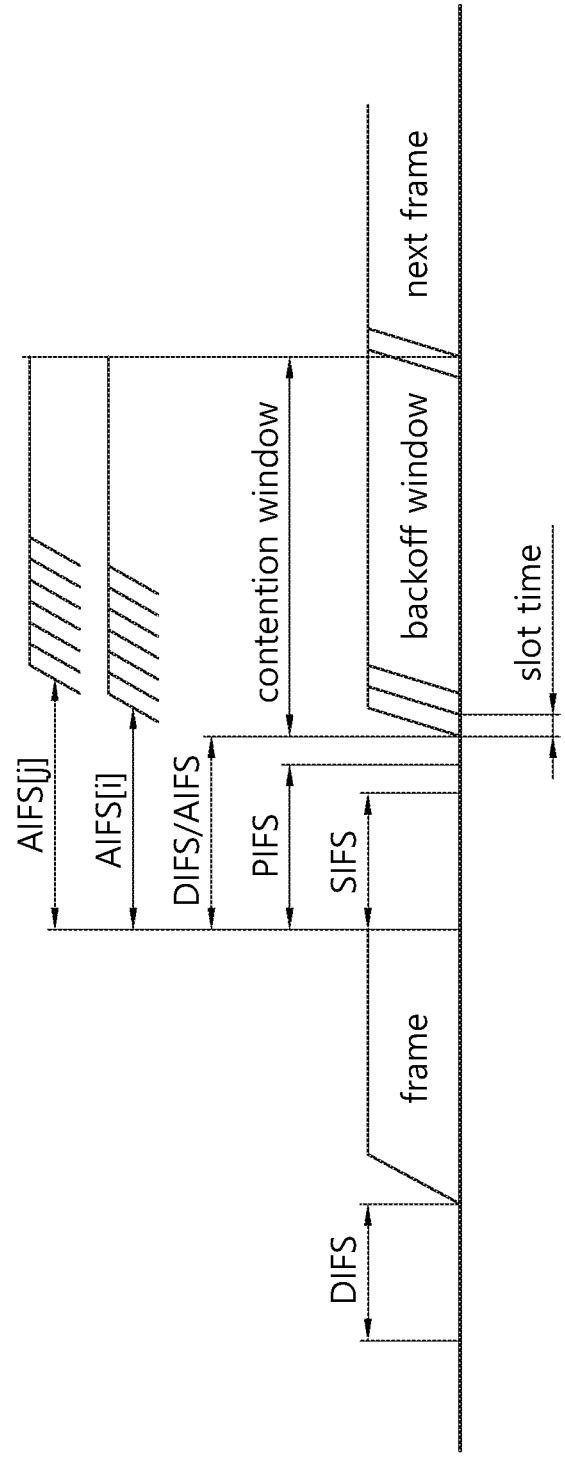
FIG. 13 is a conceptual diagram illustrating a backoff procedure according to EDCA.

FIG. 13 is a concept view showing an EDCA backoff procedure.

Referring to FIG. 13, each traffic data transmitted from an STA may have a priority and a backoff procedure may be performed based on an EDCA scheme in which contention is achieved. For example, a priority assigned to each traffic may be classified into, for example, 8 priorities. As described above, different output queues are present in one STA according to a priority, and each output queue operates according to an EDCA rule. Each output queue may transmit traffic data by using a different arbitration interframe space (AIFS) according to each priority instead of a DCF interframe space (DIFS) conventionally used. In addition, when the STA has to transmit traffic having a different priority at the same time, transmission is achieved starting from traffic having a high priority to avoid a collision in the STA.

The backoff procedure may occur in the following situation. For example, if a frame is transmitted in the STA, it may be used when a collision occurs in transmission and thus retransmission is necessary. To start the backoff procedure, each STA sets a random backoff time Tb[i] in a backoff timer. The random backoff time may be calculated using Equation 1 below as a pseudo-random integer value.

$$T_b[i] = \text{Random}(i) \times \text{SlotTime} \quad \text{[Equation 1]}$$

Herein, Random(i) is a function which generates any integer between 0 and CW[i] by using a uniform distribution. CW[i] is a contention window between a minimum contention window CWmin[i] and a maximum contention window CWmax[i], and i denotes a traffic priority. Whenever a collision occurs, a new contention window $CW_{new}[i]$ is calculated based on Equation 2 below by using an old window $CW_{old}[i]$.

$$CW_{new}[i] = ((CW_{old}[i]+1) \times PF) - 1 \quad \text{[Equation 2]}$$

Herein, PF is calculated according to a procedure defined in the IEEE 802.11e standard. For example, PF may be set to '2'. The values CWmin [i], AIFS [i], and PF may be transmitted from the AP by using a QoS parameter set element which is a management frame.

Hereinafter, in an embodiment of the present invention, a terminal may be a device capable of supporting both a wireless LAN system and a cellular system. That is, the terminal may be interpreted as a UE supporting the cellular system or an STA supporting the wireless LAN system.

Figure 14:
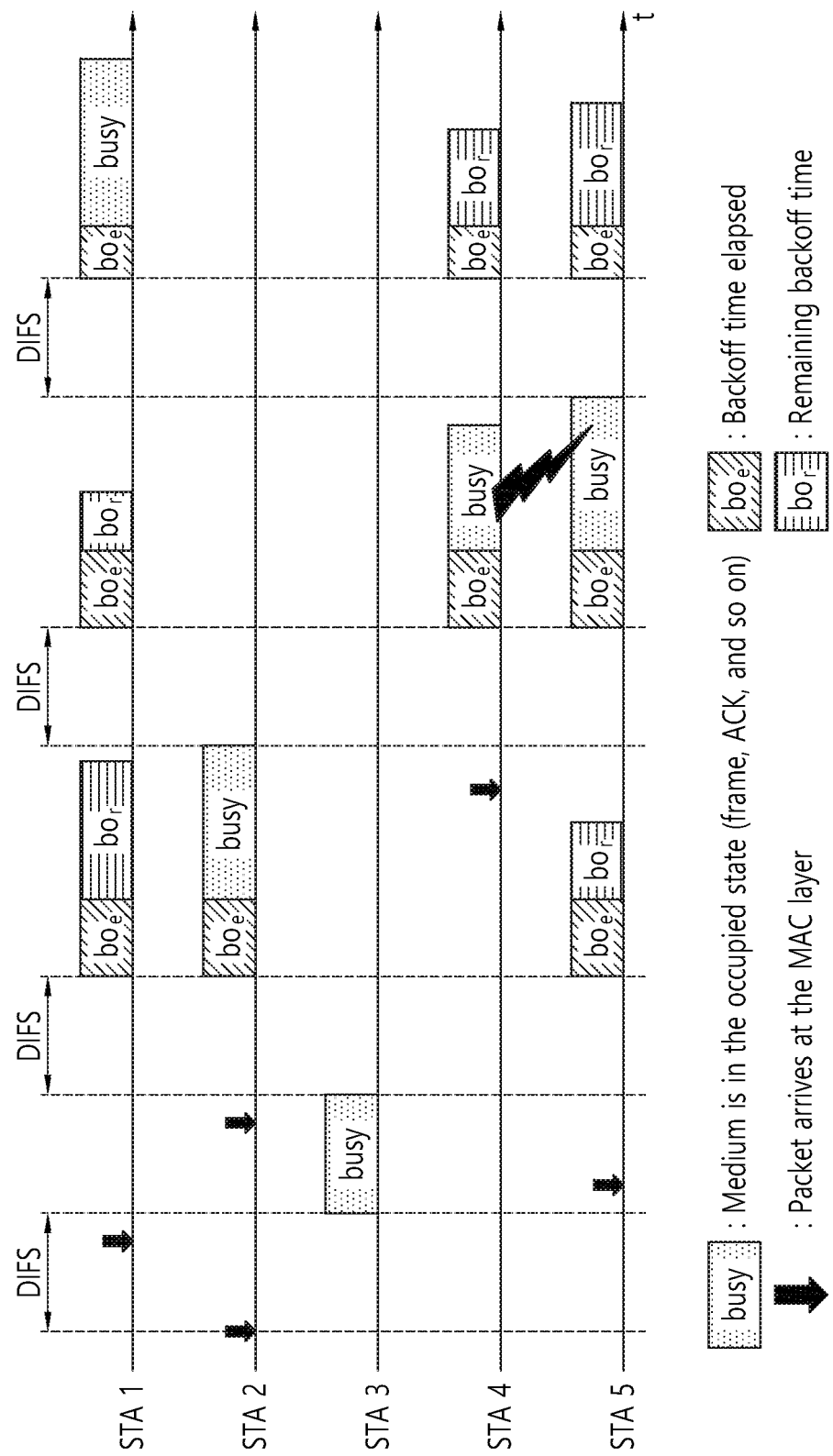
FIG. 14 is a diagram for explaining a backoff period and a frame transmission procedure in a wireless communication system.

FIG. 14 is a diagram for explaining a backoff period and a frame transmission procedure in a wireless communication system.

When a specific medium is changed from an occupy (or busy) state to an idle state, several STAs may attempt data (or frame) transmission. In this case, as a method for minimizing a collision between STAs, each STA may select a random backoff time and may attempt transmission after waiting for a corresponding time slot.

When the random backoff procedure is initiated, the STA may count down the determined backoff count time on a slot time basis, and may continuously monitor a medium during the countdown. When the medium is monitored in the busy state, the STA stops the countdown and waits. When the medium is monitored in the idle state, the STA resumes the countdown.

Referring to FIG. 14, when a packet for an STA3 arrives at an MAC layer of the STA3, the STA3 may transmit a frame immediately after identifying that the medium is idle by DIFS.

On the other hand, the remaining STAs may monitor that the medium is in the busy state and may wait. In the meantime, data to be transmitted may be generated in each of STAs 1, 2, and 5. Each STA may wait for DIFS when the medium is monitored in the idle state, and thereafter each STA may count down an individual random backoff time selected by each STA.

Referring to FIG. 14, a case where the STA2 selects a shortest backoff time, and the STA1 selects a longest backoff count value is shown. It is shown in FIG. 14 that a remaining backoff time of the STA5 is shorter than a remaining backoff time of the STA1 at a time at which the STA2 finishes backoff counting for the selected random backoff time and starts frame transmission.

Subsequently, the STA1 and the STA5 stop the countdown and waits during the STA2 occupies a medium. When the medium occupancy of the STA2 is finished and thus the medium is in the idle state again, the STA1 and the STA5 resume the countdown for the remaining backoff time which has stopped after waiting for the DIFS. In this case, since the STA5 has a shorter remaining backoff time than the STA1, the STA5 may transmit a frame prior to the STA1.

Meanwhile, data to be transmitted by the STA4 may arrive at an MAC layer of the STA4 during the STA2 occupies the medium. In this case, the STA4 may wait for DIFS when the medium is in the idle state, and thereafter may count down a random backoff time selected by the STA4.

FIG. 14 shows a case where the remaining backoff time of the STA5 incidentally coincides with the random backoff time of the STA4. In this case, a collision may occur between the STA4 and the STA5. When the collision occurs between the STAs, both the STA4 and the STA5 cannot receive ACK, which leads to a failure in data transmission.

In this case, each of the STA4 and the STA5 may calculate a contention window $CW_{new}[i]$ according to Equation 2 above. Subsequently, each of the STA4 and the STA5 may count down a random backoff time newly calculated according to Equation 1 above.

On the other hand, the STA1 may wait during a medium is in the busy state due to transmission of the STA4 and the STA5. Subsequently, when the medium is in the idle state, the STA1 may resume backoff counting after waiting for DIFS and may transmit a frame at the expiry of the remaining backoff time.

A CSMA/CA mechanism includes virtual carrier sensing as well as physical carrier sensing in which an AP and/or an STA directly senses a medium.

The virtual carrier sensing is intended to compensate for a problem which may occur on medium access such as a hidden node problem or the like. For the virtual carrier sensing, MAC of a WLAN system uses a network allocation vector (NAV). The NAV is a value used by an AP and/or STA, which is currently using a medium or has a right to use it, to indicate a remaining time until the medium is in an available state to another AP and/or STA. Therefore, the value which is set to the NAV corresponds to an interval scheduled to use the medium by an AP and/or STA for transmitting a corresponding frame, and an STA receiving the NAV value is prohibited from accessing the medium during the interval. The NAV may be set, for example, according to a value of a duration field of an MAC header of the frame.

Figure 15:
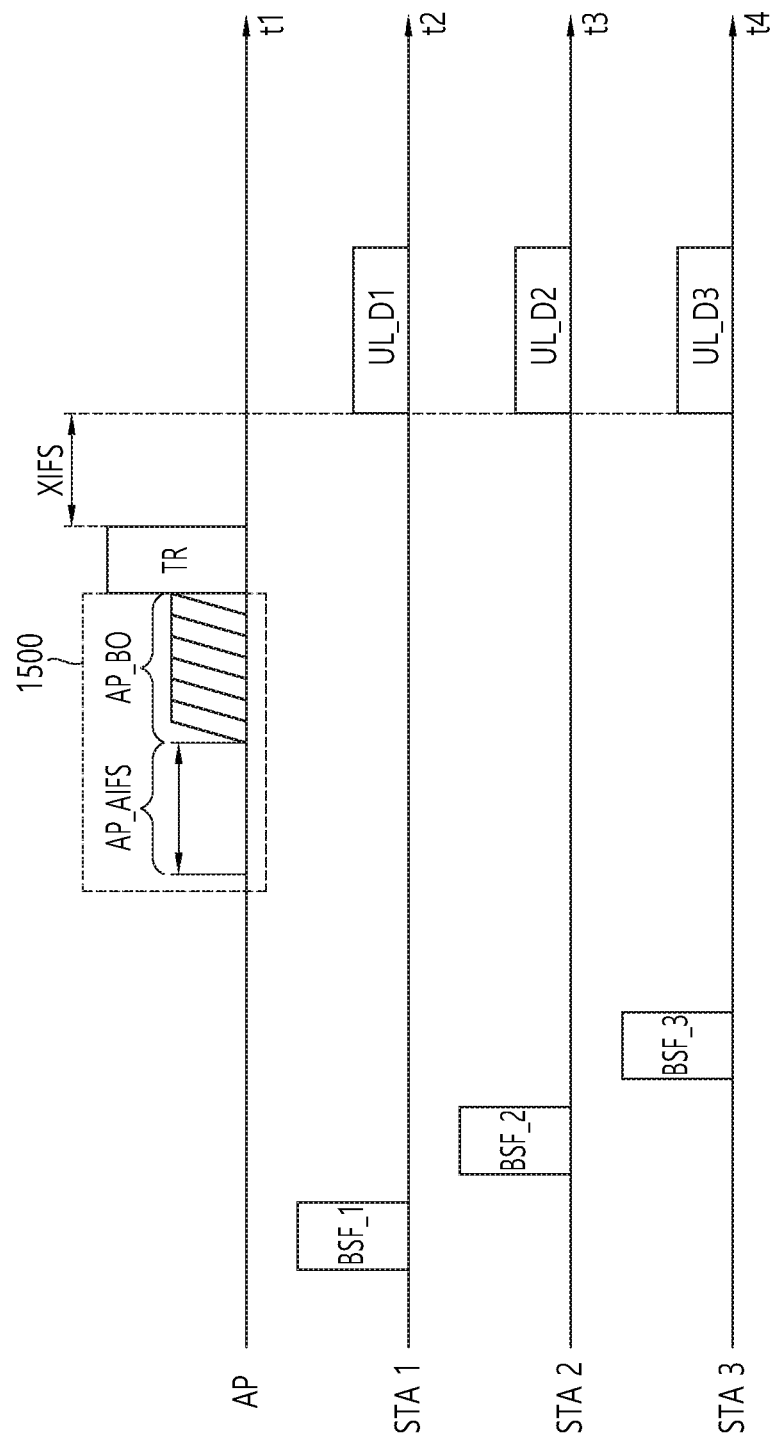
FIG. 15 shows a method of transmitting a trigger frame according to an embodiment of the present invention.

FIG. 15 shows a method of transmitting a trigger frame according to an embodiment of the present invention. A horizontal axis of an access point (hereinafter, AP) of FIG. 15 denotes a time t1, and a vertical axis of the AP may be association with a presence or absence of a frame to be transmitted (e.g., a trigger frame).

A horizontal axis of an STA1 of FIG. 15 denotes a time t2, and a vertical axis of the STA1 may be associated with a presence or absence of a frame to be transmitted (e.g., UL_D1). A horizontal axis of an STA2 of FIG. 15 denotes a time t3, and a vertical axis of the STA2 may be associated with a presence or absence of a frame to be transmitted (e.g., UL_D2). A horizontal axis of an STA3 of FIG. 15 denotes a time t4, and a vertical axis of the STA3 may be associated with a presence or absence of a frame to be transmitted (e.g., UL_D3).

Referring to FIG. 15, the AP may receive buffer state information (hereinafter, 'BSI') from the STA. The BSI is transmitted from the STA to assist the AP to allocate uplink multi-user resources (UL MU resources) in an efficient manner.

The BSI may be received from the STA in response to a trigger frame of a buffer state report poll (BSRP) type transmitted in advance by the AP. In addition, the BSI may also be received from the STA on the basis of channel contention of the STAs for an uplink channel.

For example, the AP may receive each of buffer status frames (BSFs) 1 to 3 including BSI_1 to BSI_3 from the STA1 to the STA3. The BSI_1 may be associated with quality of service (QoS) of first uplink data (UL_D1) to be transmitted.

Specifically, if the UL_D1 has a highest priority, QoS information 1 may be associated with a voice (VO)-type AC. If the UL_D1 has a lowest priority, the QoS information 1 may be associated with a best effort (BE)-type AC.

In addition, if the UL_D1 has a priority lower than that of the VO-type AC, the QoS information 1 may be associated with a Video (VI)-type AC. If the UL_D1 has a priority lower than that of the VI-type AC and higher than that of the BE-type AC, the QoS information 1 may be associated with a background (BK)-type AC.

Likewise, the BSI_2 may be associated with QoS of second uplink data (UL_D2) to be transmitted from the STA2. The BSI_3 may be associated with QoS of third uplink data (UL_D3) to be transmitted from the STA3.

The UL_D1 to UL_D3 of FIG. 15 may be data delivered to the AP through a radio resource individually configured by the AP in an overlapping time interval.

The AP may include a plurality of AP buffers. The plurality of buffers of the present specification may include a first downlink buffer for downlink data of a VO-type AC (AC_VO) having a highest priority, a second downlink buffer for downlink data of a BE-type AC (AC_BE) having a lowest priority, a third downlink buffer for downlink data of a VI-type AC (AC_VI) having a priority lower than that of the AC_VO, and a fourth downlink buffer for downlink data of an AC_BK having a priority lower than that of the AC_VI and higher than that of the AC_BE.

The plurality of AP buffers may have a plurality of parameters individually configured in association with respective ACs. For example, the plurality of parameters may include information regarding AIFS [AC], CWmin [AC], and CWmax[AC]. In addition, the plurality of AP buffers may be implemented using a static random access memory (SRAM) or a dynamic random access memory (DRAM).

The AP in FIG. 15 may determine a primary AC on the basis of the BSI_1 to BSI_3 received from the STAs 1 to 3. The primary AC may be determined through a virtual backoff operation performed in a virtual queue which is a logical entity in the AP.

A trigger interval 1500 may be determined based on parameters corresponding to the primary AC. The trigger interval 1500 includes a first interval AP_AIFS and a second interval AP_BO. The first interval AP_AIFS may be an interval based on AIFS [AC] among the parameters of the determined primary AC. The second interval AP_BO may be an interval determined by Equation 1 on the basis of CWmin[AC] and CWmax[AC] among the parameters of the determined primary AC.

The virtual backoff operation mentioned in the present specification will be described below in greater detail with reference to the accompanying drawings.

The AP may transmit a trigger frame TR through an AP buffer corresponding to the primary AC after the trigger interval 1500. For example, if the primary AC is determined as the AC_VO type, the trigger frame TR may be transmitted through the first downlink buffer. If the primary AC is determined as the AC_BE type, the trigger frame TR may be transmitted through the second downlink buffer. If the primary AC is determined as the AC_VI type, the trigger frame TR may be transmitted through the third downlink buffer. If the primary AC is determined as the AC_BK type, the trigger frame TR may be transmitted through the fourth downlink buffer.

A plurality of STAs which have received the trigger frame TR may transmit a plurality of uplink data to the AP after xIFS. For example, the xIFS may be an arbitration interframe space (AIFS).

In case of FIG. 15, an STA1 to an STA3 may transmit UL_D1 to UL_D3 in response to the trigger frame TR. The trigger frame TR may include information regarding time and frequency resources for uplink data.

The UL D1 to UL D3 transmitted to an AP in response to the trigger frame TR may be transmitted in an overlapping time interval. In addition, the UL D1 to the UL D3 may be transmitted through radio resources individually configured by the AP.

Figure 16:
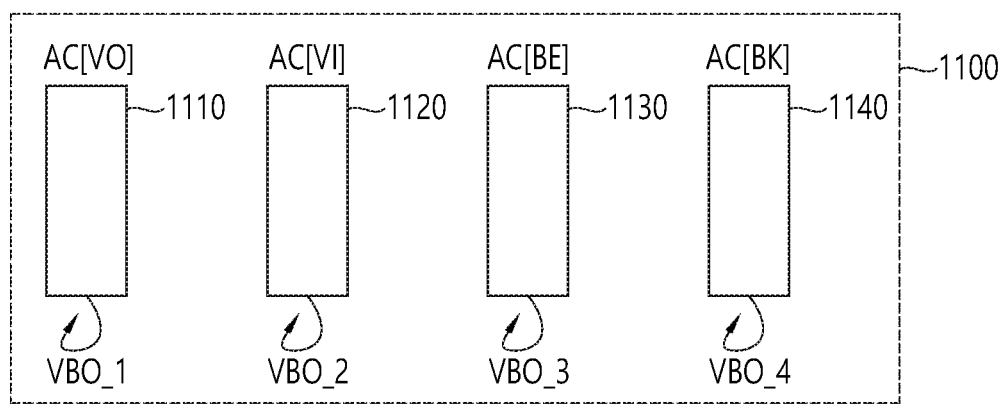
FIG. 16 is a diagram for explaining a virtual backoff operation performed by an AP according to an embodiment of the present invention.
Figure 16:
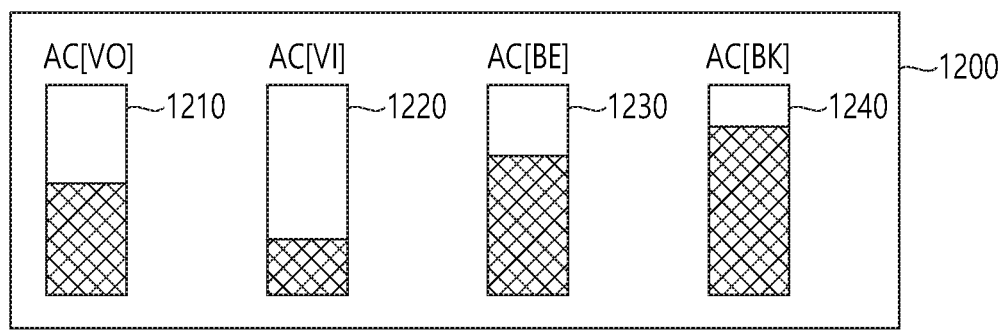

FIG. 16 is a diagram for explaining a virtual backoff operation performed by an AP according to an embodiment of the present invention.

Referring to FIG. 16, an AP 1000 may include an uplink virtual buffer 1100 and a downlink AP buffer 1200. The AP 1000 may perform the virtual backoff operation on the basis of QoS information of uplink data to be individually received from a plurality of STAs.

The uplink virtual buffer 1100 may include a plurality of virtual buffers 1110 to 1140 which are logical entities. The first virtual buffer 1110 may be associated with AC_VO. Specifically, the AP 1000 may perform a first virtual backoff operation VBO_1 based on a first buffer state frame (BSF_1) received from an STA to which the first uplink data associated with AC_VO is to be transmitted. In this case, the BSF_1 may include QoS information of first uplink data.

For example, the AP 1000 performing the first virtual backoff operation (VBO_1) for the first virtual buffer 1110 may count down a first virtual backoff time determined according to Equation 1 on the basis of a parameter (e.g., AIFS [AC], CWmin[AC], CWmax[AC]) corresponding to AC_VO. In this case, the parameter corresponding to AC_VO may be set according to a default value.

The second virtual buffer 1120 may be associated with AC_VI. Specifically, the AP 1000 may perform a second virtual backoff operation (VBO_2) on the basis of a second buffer status frame (BSF_2) received from an STA to which uplink data associated with AC_VI is to be transmitted. In this case, the BSF_2 may include QoS information of second uplink data.

For example, the AP 1000 which performs the VBO_2 for a second virtual buffer 1120 may count down a second virtual backoff time determined according to Equation 1 on the basis of a parameter (e.g., AIFS [AC], CWmin[AC], CWmax[AC]) corresponding to AC_VI. In this case, the parameter corresponding to AC_VI may be set according to a default value.

The third virtual buffer 1130 may be associated with AC_BE. Specifically, the AP 1000 may perform a third virtual backoff operation (VBO_3) based on a third buffer state frame (BSF_3) received from an STA to which the first uplink data associated with AC_BE is to be transmitted. In this case, the BSF_3 may include QoS information of third uplink data.

For example, the AP 1000 performing the VBO_3 for the first virtual buffer 1110 may count down a third virtual backoff time determined according to Equation 1 on the basis of a parameter (e.g., AIFS [AC], CWmin[AC], CWmax[AC]) corresponding to AC_BE. In this case, the parameter corresponding to AC_BE may be set according to a default value.

The fourth virtual buffer 1140 may be associated with AC_BK. Specifically, the AP 1000 may perform a fourth virtual backoff operation (VBO_4) on the basis of a fourth buffer status frame (BSF_4) received from an STA to which uplink data associated with AC_BK is to be transmitted. In this case, the BSF_4 may include QoS information of fourth uplink data.

For example, the AP 1000 which performs the VBO_4 for a fourth virtual buffer 1120 may count down a fourth virtual backoff time determined according to Equation 1 on the basis of a parameter (e.g., AIFS [AC], CWmin[AC], CWmax[AC]) corresponding to AC_BK. In this case, the parameter corresponding to AC_BK may be set according to a default value.

For reference, the default value of the parameter corresponding to each AC may be as shown in Table 2 below.

TABLE 2

| AC | $CW_{min}$ | $CW_{max}$ | AIFS | TXOP limit |
|---|---|---|---|---|
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |

The AP 1000 may perform the VBO_1 to the VBO_4 to determine an AC associated with a virtual buffer of which a countdown ends first as a primary AC. In this case, the primary AC may be used to determine a downlink buffer for transmission of a trigger frame to be transmitted from an AP to a plurality of STAs.

The downlink AP buffer 1200 may include a plurality of AP buffers 1210 to 1240. The first AP buffer 1210 may be associated with AC_VO. Specifically, the first AP buffer 1210 may buffer downlink data associated with the AC_VO to be transmitted to the STA. The second AP buffer 1220 may be associated with AC_VI. Specifically, the second AP buffer 1220 may buffer downlink data associated with the AC_VI to be transmitted to the STA.

In addition, the third AP buffer 1230 may buffer downlink data associated with AC_BE to be transmitted to the STA. The fourth AP buffer 1240 may be associated with AC_BK. Specifically, the fourth AP buffer 1240 may buffer downlink data associated with the AC_BK to be transmitted to the STA.

As mentioned above, the trigger frame may be transmitted through an AP buffer corresponding to the primary AC among the plurality of AP buffers. For example, when the countdown of the second virtual buffer 1120 ends first, the AP may determine AC_VI as the primary AC. Subsequently, the AP may transmit a trigger frame through the second AP buffer 1220 associated with the AC_VI among the plurality of AP buffers 1210 to 1240.

The AP may control the AP buffer so that the trigger frame is transmitted prior to downlink data buffered in the AP buffer. Alternatively, the AP may control the AP buffer so that the downlink data buffered in the AP buffer is transmitted first and thereafter the trigger frame is transmitted.

Figure 17:
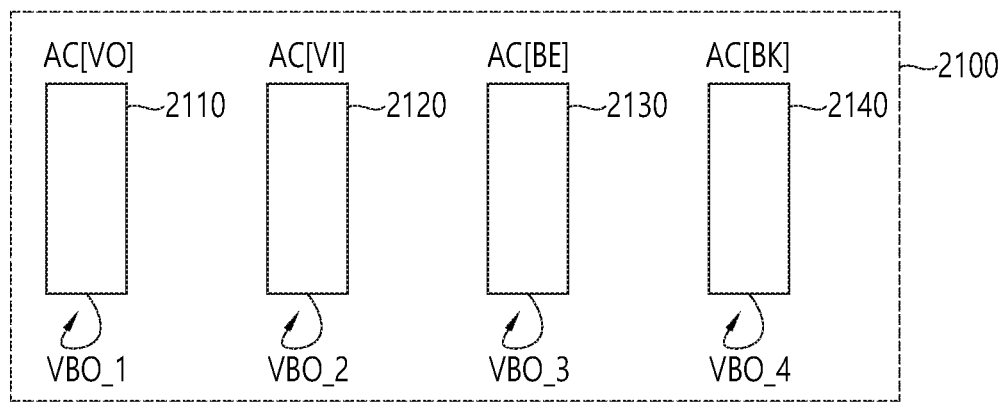
FIG. 17 is a diagram for explaining a virtual backoff operation according to another embodiment of the present invention.
Figure 17:
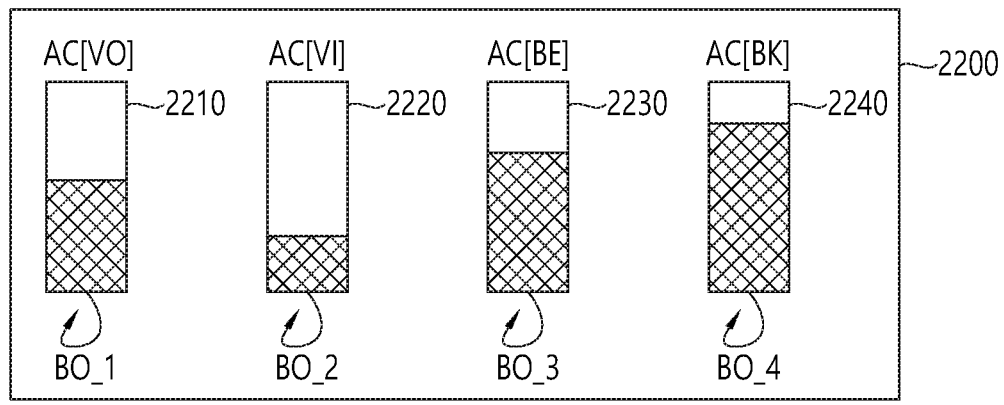

FIG. 17 is a diagram for explaining a virtual backoff operation according to another embodiment of the present invention.

Referring to FIG. 17, an AP 2000 may include an uplink virtual buffer 2100 and a downlink AP buffer 2200. The AP 2000, uplink virtual buffer 2100, and downlink AP buffer 2200 of FIG. 17 are similar to the aforementioned AP 110, uplink virtual buffer 1100, and downlink AP buffer 1200 of FIG. 16.

However, the AP 2000 of FIG. 17 may perform not only virtual backoff operations (i.e., VBO_1 to VBO_4) for the uplink virtual buffer 2100 but also backoff operations (i.e., BO_1 to BO_4) for the downlink AP buffer 2200.

The downlink AP buffer 2200 of FIG. 17 may include a plurality of AP buffers 2210 to 2400.

The first AP buffer 2210 may be associated with AC_VO. For example, the AP 2000 performing the BO_1 for the first AP buffer 2210 may count down a first backoff time determined according to Equation 1 on the basis of a parameter (e.g., AIFS [AC], CWmin[AC], CWmax[AC]) corresponding to AC_VO. In this case, a default value of the parameter corresponding to AC_VO of Table 2 may be set in the first AP buffer 2210.

The second AP buffer 2220 may be associated with AC_VI. For example, the AP 2000 performing the BO_2 for the second AP buffer 2220 may count down a second backoff time determined according to Equation 1 on the basis of a parameter (e.g., AIFS [AC], CWmin[AC], CWmax[AC]) corresponding to AC_VI. In this case, a default value of the parameter corresponding to AC_VI of Table 2 may be set in the second AP buffer 2220.

In addition, the third AP buffer 2230 may be associated with AC_BE. For example, the AP 2000 performing the BO_3 for the third AP buffer 2230 may count down a third backoff time determined according to Equation 1 on the basis of a parameter (e.g., AIFS [AC], CWmin[AC], CWmax[AC]) corresponding to AC_BE. In this case, a default value of the parameter corresponding to AC_BE of Table 2 may be set in the third AP buffer 2230.

The fourth AP buffer 2240 may be associated with AC_BK. For example, the AP 2000 performing the BO_4 for the fourth AP buffer 2240 may count down a fourth backoff time determined according to Equation 1 on the basis of a parameter (e.g., AIFS [AC], CWmin[AC], CWmax[AC]) corresponding to AC_BK. In this case, a default value of the parameter corresponding to AC_BK of Table 2 may be set in the fourth AP buffer 2240.

The AP 2000 may perform the BO_1 to BO_4 to determine an AC associated with an AP buffer of which a countdown ends first as a primary AC. Accordingly, the AP 2000 may transmit a trigger frame through an AP buffer corresponding to the primary AC determined based on the BO_1 to BO_4 irrespective of a result of the VBO_1 to VBO_4 performed in the uplink virtual buffer 2100.

Figure 18:
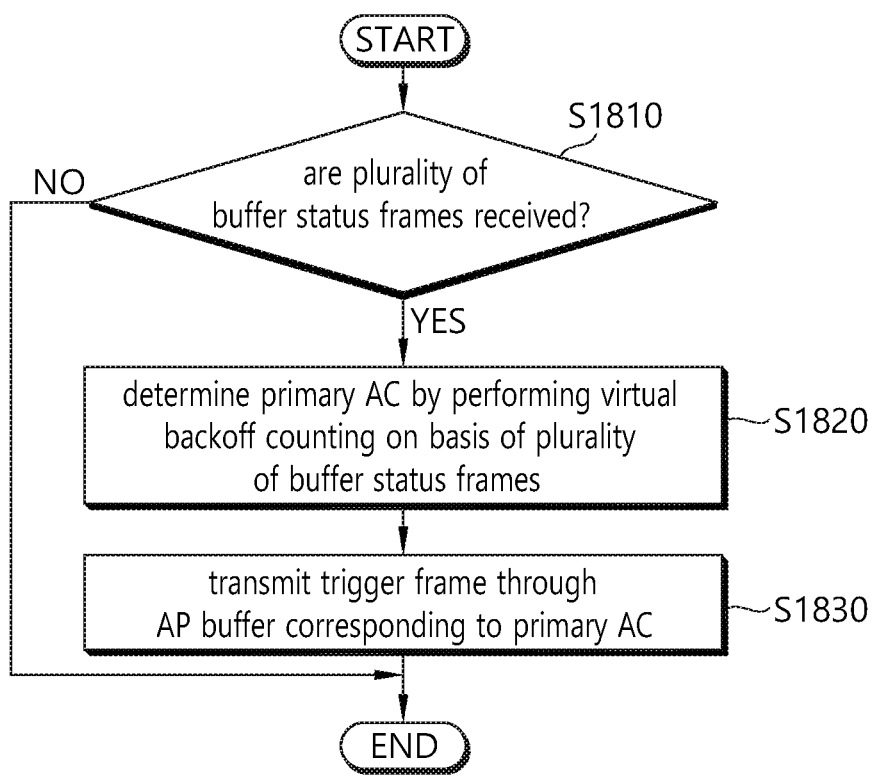
FIG. 18 is a flowchart showing a method of transmitting a trigger frame according to an embodiment of the present invention.

FIG. 18 is a flowchart showing a method of transmitting a trigger frame according to an embodiment of the present invention.

Referring to FIG. 16, FIG. 17, and FIG. 18, in step S1810, an AP may determine whether a buffer status frame (BSF) is received from a plurality of STAs. This is because a trigger frame is basically a frame which requests uplink data transmission from the plurality of STAs.

If the BSF is received from one STA, the procedure ends. Although not shown in the flowchart of FIG. 18, an AP which has received one BSF may defer creation of the trigger frame until a plurality of BSFs are received. Upon receiving the BSF from the plurality of STAs, the procedure proceeds to step S1820.

In step S1820, the AP may perform a plurality of virtual backoff operations based on the received plurality of BSFs. Subsequently, the AP may determine an AC associated with a virtual buffer of which a countdown ends first among the plurality of virtual backoff operations as a primary AC. Details of determining the primary AC mentioned in FIG. 18 are described with reference to FIG. 16.

In step S1830, the AP may transmit the trigger frame through an AP buffer corresponding to the primary AC. Accordingly, the AP may receive uplink data transmitted through an overlapping time interval and a radio resource individually configured by the AP in response to STAs which have received the trigger frame.

Figure 19:
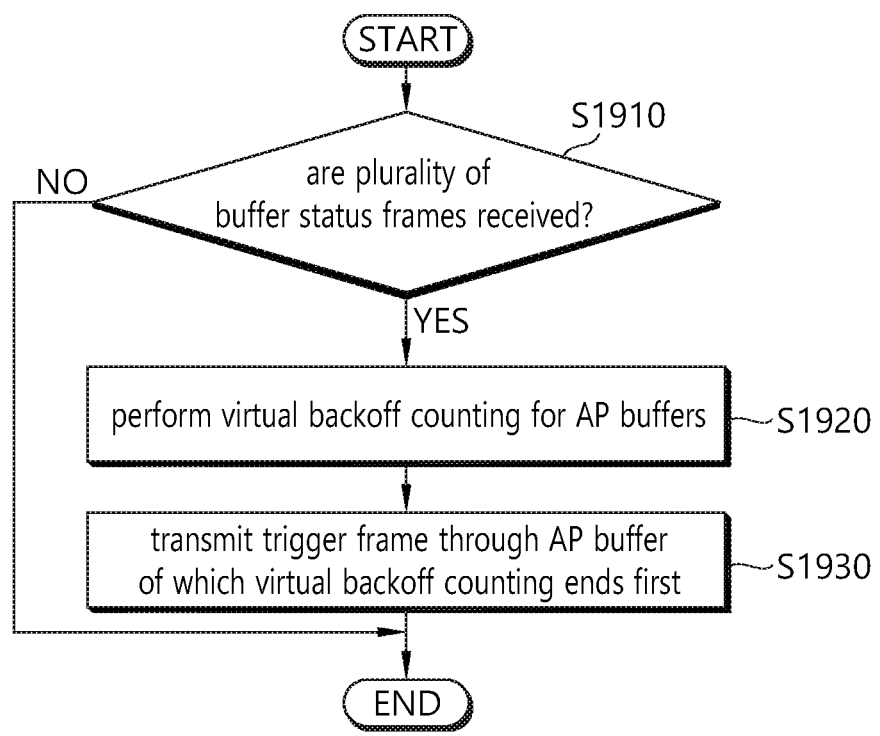
FIG. 19 is a flowchart showing a method of transmitting a trigger frame according to another embodiment of the present invention.

FIG. 19 is a flowchart showing a method of transmitting a trigger frame according to another embodiment of the present invention.

Referring to FIG. 16, FIG. 18, and FIG. 19, in step S1910, since the trigger frame is basically a frame which requests uplink data transmission from a plurality of STAs, an AP may determine whether a BSF is received from the plurality of STAs.

If the BSF is received from one STA, the procedure ends. Although not shown in the flowchart of FIG. 19, an AP which has received one BSF may defer creation of the trigger frame until at least one BSF is received from other STAs. If it is determined in step S1910 that the BSF is received from the plurality of STAs, the procedure proceeds to step S1920.

In step S1920, the AP may perform a virtual backoff operation on an AP buffer on the basis of a parameter corresponding to an AC associated with each AP buffer of the downlink AP buffer 2200 irrespective of a result of the virtual backoff operation of the uplink virtual buffer 2100.

The AP 2000 may perform the BO_1 to BO_4 for the downlink AP buffer 2200 to determine an AC associated with an AP buffer of which a countdown ends first as a primary AC. Details of determining the primary AC mentioned in FIG. 19 are described with reference to FIG. 17.

In step S1930, the AP may transmit the trigger frame through an AP buffer corresponding to the primary AC. Accordingly, the AP may receive uplink data transmitted through an overlapping time interval and a radio resource individually configured by the AP in response to STAs which have received the trigger frame.

Figure 20:
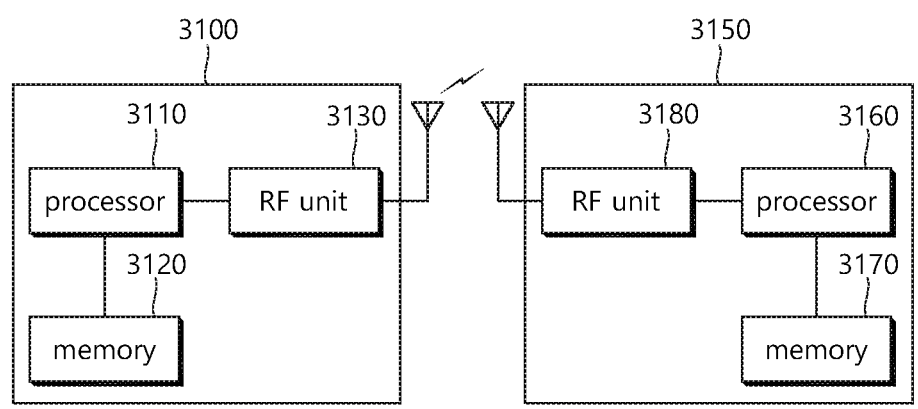
FIG. 20 is a block view illustrating a wireless device to which the exemplary embodiment of the present invention can be applied.

FIG. 20 is a block view illustrating a wireless device to which the exemplary embodiment of the present invention can be applied.

Referring to FIG. 20, as an STA that can implement the above-described exemplary embodiment, the wireless device may correspond to an AP or a non-AP station (STA). The wireless device may correspond to the above-described user or may correspond to a transmitting device transmitting a signal to the user.

The AP 2000 includes a processor 2010, a memory 2020, and a radio frequency (RF) unit 2030.

The RF unit 2030 is connected to the processor 2010, thereby being capable of transmitting and/or receiving radio signals.

The processor 2010 implements the functions, processes, and/or methods proposed in the present invention. For example, the processor 2010 may be implemented to perform the operations according to the above-described exemplary embodiments of the present invention. More specifically, among the operations that are disclosed in the exemplary embodiments of FIG. 1 to FIG. 19, the processor 2010 may perform the operations that may be performed by the AP.

The non-AP STA 2050 includes a processor 2060, a memory 2070, and a radio frequency (RF) unit 2080.

The RF unit 2080 is connected to the processor 2060, thereby being capable of transmitting and/or receiving radio signals.

The processor 2060 implements the functions, processes, and/or methods proposed in the present invention. For example, the processor 2060 may be implemented to perform the operations of the non-AP STA according to the above-described exemplary embodiments of the present invention. The processor may perform the operations of the non-AP STA, which are disclosed in the exemplary embodiments of FIG. 1 to FIG. 19.

The processor 2010 and 2060 may include an application-specific integrated circuit (ASIC), another chip set, a logical circuit, a data processing device, and/or a converter converting a baseband signal and a radio signal to and from one another. The memory 2020 and 2070 may include a read-only memory (ROM), a random access memory (RAM), a flash memory, a memory card, a storage medium, and/or another storage device. The RF unit 2030 and 2080 may include one or more antennas transmitting and/or receiving radio signals.

When the exemplary embodiment is implemented as software, the above-described method may be implemented as a module (process, function, and so on) performing the above-described functions. The module may be stored in the memory 2020 and 2070 and may be executed by the processor 2010 and 2060. The memory 2020 and 2070 may be located inside or outside of the processor 2010 and 2060 and may be connected to the processor 2010 and 2060 through a diversity of well-known means.

Although an embodiment of the invention has been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method for transmitting a frame in a wireless local area network (WLAN) system performed by an access point (AP), the method comprising:
   receiving a first buffer status frame (BSF) used for first uplink (UL) data of a first station (STA), wherein the first UL data has a first access category (AC) related to a first type quality of service (QoS);
   receiving a second BSF used for second UL data of a second STA, wherein the second UL data has a second AC related to a second type QoS;
   configuring a trigger frame soliciting a plurality of UL frames from the first and second STAs, wherein the plurality of UL frames are used for receiving the first and second UL data, wherein the plurality of UL frames are received in a same time interval through frequency resources allocated by the trigger frame;
   determining a primary AC for the trigger frame among the first AC and the second AC, wherein the AP performs a first back-off operation for the first AC and a second back-off operation for the second AC, wherein the primary AC for the trigger frame is determined based on the first and second back-off operations;
   determining downlink (DL) QoS data based on the primary AC for the trigger frame, wherein the DL QoS data is to be transmitted with the trigger frame, wherein an AC of the DL QoS data is same as the primary AC;
   configuring a PHY protocol data unit (PPDU) including the DL QoS data and the trigger frame;
   performing a channel access procedure based on the primary AC to acquire transmission opportunity (TXOP) for a wireless medium; and
   transmitting the PPDU based on the TXOP.

2. The method of claim 1, wherein the AP includes a plurality of DL buffers including a first DL buffer for buffering at least one frame belonging to first AC, and a second DL buffer for buffering at least one frame belonging to the second AC.

3. An access point (AP) for transmitting a frame in a wireless local area network (WLAN) system, the AP comprising:
   a radio frequency (RF) circuit transmitting a radio signal; and
   a processor operatively coupled to the RF circuit, wherein the processor is configured to:
   receive a first buffer status frame (BSF) used for first uplink (UL) data of a first station (STA), wherein the first UL data has a first access category (AC) related to a first type quality of service (QoS);
   receive a second BSF used for second UL data of a second STA, wherein the second UL data has a second AC related to a second type QoS,
   configure a trigger frame soliciting a plurality of UL frames from the first and second STAs, wherein the plurality of UL frames are used for receiving the first and second UL data, wherein the plurality of UL frames are received in a same time interval through frequency resources allocated by the trigger frame;
   determine a primary AC for the trigger frame among the first AC and the second AC, wherein the AP performs a first back-off operation for the first AC and a second back-off operation for the second AC, wherein the primary AC for the trigger frame is determined based on the first and second back-off operations;
   determine downlink (DL) QoS data based on the primary AC for the trigger frame, wherein the DL QoS data is to be transmitted with the trigger frame, wherein an AC of the DL QoS data is same as the primary AC;
   configure a PHY protocol data unit (PPDU) including the DL QoS data and the trigger frame;
   perform a channel access procedure based on the primary AC to acquire transmission opportunity (TXOP) for a wireless medium; and
   transmit the PPDU based on the TXOP.

4. The AP of claim 3, wherein the AP includes a plurality of DL buffers include a first DL buffer for buffering at least one frame belonging to the first AC, and a second DL buffer for buffering at least one frame belonging to the second AC, than that of the BE type.

* * * * *